3,178,387
PLASTICIZED BUTYL RUBBER CARBON
BLACK COMPOSITIONS
Albert M. Gessler, Cranford, N.J., assignor to Esso Research and Engineering Company, a corporation of Delaware
No Drawing. Filed Dec. 24, 1959, Ser. No. 861,789
5 Claims. (Cl. 260—31.8)

This invention relates to a novel process of improving the properties of butyl rubber. More particularly it relates to a process of this nature wherein butyl rubber is heat treated with oxygen-containing carbon blacks and then a plasticizer is added to the resultant mixture, and the products obtained thereby.

This application is a continuation-in-part of Serial No. 329,243, filed January 2, 1953, now abandoned.

Butyl rubber is essentially a synthetic, vulcanizable, rubbery hydrocarbon copolymer containing about 85 to 99.5 wt. percent, preferably about 95 to 99.5 wt. percent, of a $C_4$ to $C_8$ isoolefin such as 3-methyl-1-butene, 4-methyl-1-pentene, or especially isobutylene, the remainder being a $C_4$ to $C_{14}$ multiolefin, preferably a $C_4$ to $C_6$ conjugated diolefin such as butadiene, dimethyl butadiene, piperylene, or such multiolefins as vinyl fulvenes, cyclopentadiene, cyclohexadiene, or especially isoprene. The resulting rubbery copolymer has a Staudinger molecular weight of between about 25000–1,000,000 and an iodine number of about 0.5 to below 50.0 (Wijs). The preparation of such a copolymer, known in the art as butyl rubber, is described in U.S. Patent 2,356,128 to Thomas et al. and also in other patents as well as in the literature.

With such polymers it is frequently desirable to add plasticizers in order to obtain greater overall elasticity in the vulcanizate. This increased elasticity is reflected in lower damping properties, higher resilience and greater softness or suppleness in the finished vulcanized product. It is also advantageous to maintain as high a modulus of extension as possible in the plasticized polymers.

A compounding method for preparing polymer-carbon black compositions having greatly improved physical characteristics has been recently discovered. This method generally is described and claimed in U.S. Patent 2,852,486, issued Sept. 16, 1958. It is carried out by the thermal treatment of the polymer-carbon black mixture either with or without simultaneous or subsequent agitation, as by milling and mastication of mixtures of isoolefin-multiolefin copolymers with carbon black of the well-known types containing oxygen on their surfaces. Time and temperature relationships have been discovered for obtaining the maximum amount of quality improvement when operating by this method. The heat treatment is carried out prior to the addition of the total amounts of curatives and thus represents a thermal treatment of the polymer-carbon black mixtures prior to vulcanization.

It has now been found that only after the heat treatment of the butyl rubber with the carbon black having an oxygen-containing surface in the absence of vulcanizing agents, the addition of a plasticizer selected from the group consisting of non-volatile hydrocarbon oils and esters softens the treated carbon black copolymer mixtures and gives to the material the property of bounce or rebound.

The treatment described herein does not give satisfactory results when applied to natural rubber or to synthetic copolymers such as butadiene-styrene copolymers and butadiene-acrylonitrile copolymers.

It is to be understood that the surprising effects which have been discovered to result from this improved plasticizer compounding and heat interaction method are substantially limited to synthetic low unsaturation isoolefin-multiolefin copolymers and are unique to heat treated mixtures of these copolymers with carbon blacks which have an oxidized or an active oxygen-containing surface. Stated another way, this means that the surface of the carbon black used must have a pH value of less than 7, even as low as 3.5. The amount of such carbon black which can be used may range from 20 parts by weight up to 200 parts by weight based on an amount of 100 parts by weight of copolymer. About 50 parts by weight of carbon black per 100 parts of copolymer is believed to be an optimum amount for many purposes.

Carbon black, containing oxygen on its surface, can be obtained in numerous ways and it is not intended to limit the invention in any way thereto. For example, the carbon can be obtained with an oxygen-containing surface as a result of the mode of its preparation or by a subsequent treatment. Thus, the so-called channel blacks which are known to have oxygen on their surface are useful. The so-called furnace blacks differentiated by the absence of any appreciable amounts of oxygen are substantially useless when employed as such in this thermal treatment method. The furnace blacks, as well as other carbon blacks having no oxygen present, may be made completely satisfactory, however, by suitable treatment to produce an oxygen-containing surface thereon. This may be done by a variety of physical, chemical, and physicochemical methods. These include treatment of the unoxidized carbon black surfaces with oxygen, oxygen-containing gases such as air, or with an oxygen-producing substance such as the peroxides or ozone.

It is further intended that for the process and compositions of this invention any of the channel blacks such as, for instance, EPC, MPC, HPC and CC can be used, these letters denoting carbon black products well known to the trade. Furnace blacks which have been subjected to any process whereby an oxygen-containing surface is produced thereon can be used and these include SRF, HMF, CF, FF and HAF carbon blacks. Thermal blacks to which the oxygen surface has been added can also be used.

To carry out the process of the invention, a mixture of isoolefin-multiolefin copolymer and carbon black of one of the types containing oxygen on its surface is first subjected to heating for a period of time. In general, the heat treatment without mechanical agitation of the mixture can be done in a heating vessel for a period of from about 1 hour up to 7 hours at a temperature ranging from about 250° to 450° F. Exposing the mixtures to a heating in open steam is one satisfactory procedure. The higher the temperature used, the shorter the time required for the heat interaction treatment in order to obtain comparable results. Optimum results can be obtained by heat treating the mixture for about 5 hours at 320° F. For large scale operations, the shorter time periods are generally preferred.

Another manner in which this process can be carried out is by heat treating the copolymer and oxygen-containing carbon black mixture while subjecting it to mechanical agitation as in a Banbury mixer or on a rubber mill. For best results, in using the Banbury mixer, the copolymer and carbon black batch is generally heated at a temperature of from about 250° to 450° F. for about 10 to 60 minutes. Preferred conditions are heating and agitating at 380° to 450° F. for 20 to 40 minutes.

The improvements can also be achieved by the alternate heating and mechanical agitation treatment of the copolymer and carbon black mixture. These steps are conveniently carried out in cycles. Stationary heating can be done in an oven or other heating vessel at a temperature of 250° to 450° F. for periods of 15 to 60 minutes followed by a period of agitation, for instance, on a mill at 80° to 90° F. for a time of 2 to 10 minutes.

These two heating and agitation steps can be repeated as many times as desired with some improvement being realized in each cycle. From 2 to 12 cycles may be conveniently employed. Commercial expediency prevents having more than about 12 cycles.

If this heat treatment were carried out in the presence of vulcanizing agents the stock would scorch.

There is then added after the heat treatment a plasticizer selected from the group consisting of non-volatile hydrocarbon oils and esters or mixtures of these materials. The plasticizer is added after the heat treatment in order to obtain maximum treatment response.

The non-volatile hydrocarbon oils are utilized in an amount of about from 0.5 to 50 wt. percent based on the polymer. Examples of these oils are paraffinic based oils such as those having the following trade names: Solvent 100 Neutral, 150 Neutral, 250 Neutral and 450 Neutral; naphthenic based oils such as Necton 60, Faxam 40, Necton 45, and Diol 37, 50, 55, 90; aromatic oils such as Coray 230 (67%), San Arco St. (40%); and acid treated paraffinic distillates such as white oils, Bayol D, Primol D and Nujol.

The ester plasticizers that can be employed include phthalates such as dibutyl, dioctyl, diethylhexyl phthalates, phosphates such as trioctyl phosphate, etc.; butyl cellosolve, pelargonates and cellosolves. Also dibutyl sebacate, dioctyl sebacate, dihexyl sebacate, butyl cellosolve caprylate, butyl cellosolve laurate, hexyl cellosolve pelargonate, butyl cellosolve oleate, butyl carbitol pelargonate, butyl carbitol laurate, methyl cocate, butyl carbitol stearate, and many others can be used. They are utilized in an amount of from 2 to 50 wt. percent, preferably from 5 to 25 wt. percent, based on the polymer. Especially desirable and effective is dioctyl sebacate.

If desired, these heat treated polymer-carbon black and plasticized products may be modified by mixing therewith substantial amounts of additional materials including mineral fillers, pigments, etc., such as pulverized clays, limestone dust, pulverized silica, diatomaceous earth, iron oxide, additional sulfur, additional carbon black, and the like. These materials may be admixed prior to the heat treatment but are preferably added thereafter and may be used either in small amounts such as $\frac{1}{10}\%$ to 1% or 5% or so, or in large amounts for instance, 5% to 20% or 30% to 60% or more as is known in the compounding art.

The copolymer composition after the treatment and compounding can be combined with sulfur, other plasticizers and the like, and suitable sulfurization aids such as "Tuads" (tetramethylthiuram disulfide), or "Captax" (mercaptobenbothiazole), or "Altax" (2,2'-benzothiazyl disulfide) in the usual manner. Non-sulfur curing agents may also be used. The polymer, when so compounded, is cured into an elastic, rubber-like substance by the application of heat within a temperature range of 275° to 395° F. for a time interval ranging from 15 to 120 minutes in the usual way.

These improved products are especially useful as tire tread and tire casing materials. These products can also be used successfully for many other purposes, for example, for inner tube stocks, electrical insulation, lining for tanks, for rolls, for furniture, upholstery and bedding, elastic pads, shoe soles, waterproof fabrics, and the like. In all these instances, the treated copolymer possesses the improved qualities added to it by pretreatment and plasticizer but also retains the high chemical resistance of the original untreated copolymers.

The following examples are presented to illustrate the process but it is not intended that the invention be specifically limited thereto.

EXAMPLE 1

*Effect of time of plasticizer addition*

The rubbery copolymer used here was made according to U.S. Patent 2,356,128, using about 97% isobutylene and 3% of isoprene as polymerization feed; this rubber had a 60–70 Mooney value and an iodine number (Wijs) of about 10.0. The following masterbatch was prepared in the 00 Banbury mixer under "cool" conditions (without heating of the mixer).

| Component: | Parts by weight, gms. |
|---|---|
| Isobutylene-isoprene copolymer | 1500.0 |
| EPC black (channel black) | 750.0 |
| Stearic acid | 7.5 |

The mixture was taken from the Banbury to an open mill (24″), cut several times from each end and sheeted.

Three 301.0 gm. portions of the above masterbatch were set aside for further treatment. Twenty grams of an acid-treated paraffinic distillate oil of about 40 sec. SSU at 210° F. (a hydrocarbon oil marketed under the trade name "Forum 40") were added to the first portion called sample 2, and it, along with a second portion, called sample 3, which contained no plasticizer, was heated for 4 hours in open steam at 310° F. in an autoclave. The batches were removed from the autoclave and allowed to cool for one hour. The third and final portion, called sample 1, of the Banbury masterbatch was taken as the control and it received no heat treatment.

After completion of the above operations, the three admixtures were compounded respectively according to the following formulations:

| Sample No. | 1 | 2 | 3 |
|---|---|---|---|
| | No heat treatment, gms. | Heated with plasticizer, gms. | Heted without plasticizer, gms. |
| Masterbatch | 301.0 | 321.0 | 301.0 |
| Form 40 (plasticizer) | 20.0 | | 20.0 |
| Zinc oxide | 10.0 | 10.0 | 10.0 |
| Tetramethylthiuram disulfide | 2.0 | 2.0 | 2.0 |
| 2,2'-benzothiazyl disulfide | 2.0 | 2.0 | 2.0 |
| Sulfur | 4.0 | 4.0 | 4.0 |

The plasticizer in each case was added in 10 minutes on a 6″ x 12″ mill at 80° to 90° F. and with 0.040″ to 0.045″ clearance between mill rolls. The remaining powders were incorporated in 5 minutes under the same conditions. Vulcanizates were prepared by curing the compounds for 20 minutes at 307° F. Yerzley pellets which were used in the measurement of internal viscosity were given a 5 minute vulcanization lead.

Numerous tests were carried out on the vulcanizates prepared from the work just described. The data obtained are shown in Table I.

The stress-strain properties of samples 1 through 3 at various extensions were determined according to the standard procedures of ASTM D–412–49T.

The dynamic behavior of the vulcanized samples 1 through 3 was studied by the free vibration in compression of a cylindrical pellet in a weighted pendulum apparatus frequently referred to as the Yerzley Oscillograph. The damping or hysteresis effect is expressed as a product of internal viscosity and frequency since in free vibration systems the frequency cannot be controlled at a constant value. The absolute damping effect or the work of compression that is absorbed as heat is related to frequency and internal viscosity by the following equation:

$$\text{Absolute damping} = W\eta = 2\pi^2 f\eta A M^2/h$$

where $f$ = frequency
$\eta$ = internal viscosity
$M$ = amplitude
$A$ = cross sectional area of pellet
$h$ = height of pellet M, the amplitude, is controlled by the amount of weights added to the pendulum, A and h are dimensional constants so $\eta f$ is directly related to the energy loss upon vibration. The damping term, $\eta f$, is directly proportional to the internal viscosity and inversely proportional to the elasticity or resilience of the vulcanized sample.

Measurements of this $\eta f$ function were made at three temperatures on samples 1 through 3.

Electrical resisitvity in ohm centimeters was measured using equipment supplied by Leeds & Northrup.

Static heating of the copolymer-channel black masterbatch leads to improved vulcanizate quality. Thus, the modulus at 300% is seen to increase 50% and the internal viscosity at 50° C. to decrease 22%. There is also an increase in tensile strength and a diminution in ultimate extensibility. These are all indications of an increased state of cure which results from the heat treatment. If the plasticizer is not added until after the static heating has been accomplished, much greater improvements are obtained. This is an unexpected and very surprising result. The vulcanizate modulus at 300% increases 100% over that of the control (no heat treatment) and 33% over that of the compound in which plasticizer was added before the static heating. Internal viscosity at 50° C., instead of decreasing 22% as it does when the heated masterbatch contains plasticizer, decreases by 55% if the plasticizer is added after the heat treatment. Although there is no further tensile strength increase in the latter case, the ultimate extension is reduced. The electrical resistivity is 100 times as great when the heat treatment is accomplished before plasticizer addition than when it is accomplished after plasticizer addition.

TABLE I

| Sample No. | 1 | 2 | 3 |
|---|---|---|---|
| | No heat treatment | Heated with plasticizer | Heated without plasticizer |
| Modulus at— | | | |
| 100% in lbs./in.² | 150 | 150 | 150 |
| 200% in lbs./in.² | 300 | 350 | 400 |
| 300% in lbs./in.² | 500 | 750 | 1,000 |
| 400% in lbs./in.² | 850 | 1,200 | 1,650 |
| 500% in lbs./in.² | 1,300 | 1,800 | 2,300 |
| 600% in lbs./in.² | 1,950 | 2,450 | 2,900 |
| 700% in lbs./in.² | 2,550 | 3,000 | |
| Tensile strength, in lbs./in.² | 2,750 | 3,050 | 3,050 |
| Percent elongation | 760 | 715 | 650 |
| Viscosity, $\eta f \times 10^{-6}$, poises × C.P.S.: | | | |
| At 30° C | 6.44 | 3.04 | 2.65 |
| At 50° C | 3.57 | 2.80 | 1.59 |
| At 70° C | 2.46 | 1.92 | 1.13 |
| Specific resistivity in ohm-cm | 4.49×10⁷ | 6.07×10⁷ | 4.08×10⁹ |

EXAMPLE 2

Effect of polymer treated

The experiment of Example 1 was repeated with natural rubber and commercial butadiene-styrene (GR-S) copolymer. The following formulations were employed.

| Component | Parts by weight | |
|---|---|---|
| Natural rubber | 100.0 | |
| Butadiene-styrene copolymer | | 100.0 |
| EPC Black (channel black) | 50.0 | 50.0 |
| Zinc oxide | 3.0 | 5.0 |
| Forum 40 (plasticizer) | 10.0 | 10.0 |
| Phenyl β-naphthylamine | 2.5 | 2.5 |
| Stearic acid | 3.0 | 1.0 |
| Sulfur | 3.0 | 1.75 |
| Mercaptobenzothiazole | 1.0 | |
| 2,2'-benzothiazyldisulfide | | 1.5 |

The data obtained by a study of the properties of this series of samples is shown in Table II below.

TABLE II.—PLASTICIZER ADDITION WITH NATURAL RUBBER AND BUTADIENE-STYRENE COPOLYMER

| | Natural rubber | | | Butadiene-styrene copolymer | | |
|---|---|---|---|---|---|---|
| | No heat treatment | Heated with plasticizer | Heated without plasticizer | No heat treatment | Heated with plasticizer | Heated without plasticizer |
| Sample Nos | 7 | 8 | 9 | 4 | 5 | 6 |
| Modulus at— | | | | | | |
| 100% in lbs./in.² | 335 | 230 | 230 | 275 | 250 | 195 |
| 200% in lbs./in.² | 760 | 580 | 580 | 525 | 575 | 450 |
| 300% in lbs./in.² | 1,310 | 1,110 | 1,185 | 875 | 1,115 | 1,010 |
| 400% in lbs./in.² | 2,025 | 1,930 | 1,970 | 1,260 | 1,930 | 1,760 |
| 500% in lbs./in.² | 2,890 | | | 1,835 | | 2,410 |
| Tensile strength in lbs./in.² | 3,140 | 2,380 | 2,405 | 2,330 | 2,475 | 2,410 |
| Percent elongation | 575 | 455 | 445 | 600 | 465 | 500 |
| Viscosity, $\eta f \times 10^{-6}$, poises×C.P.S.: | | | | | | |
| At 30° C | 2.18 | 1.69 | 1.46 | 4.24 | 3.36 | 3.20 |
| At 50° C | 1.75 | 1.36 | 1.15 | 3.50 | 2.61 | 2.45 |
| At 70° C | 1.55 | 1.12 | 0.90 | 2.63 | 1.88 | 1.79 |
| Specific resistivity in ohm-cm | 8.57×10⁷ | >10¹⁴ | >10¹⁴ | 1.52×10⁸ | >10¹⁴ | >10¹⁴ |

The cool mixing and subsequent milling of the natural rubber compound was done at 150°–160° F. Plasticizer was added in 10 minutes on the open mill. Otherwise, the procedure used was exactly that described in connection with Example 1.

Vulcanizates were prepared by curing specimens for 20 minutes at 320° F. Yerzley pellets which were employed for measurements of internal viscosity were given a 5 minute vulcanization lead.

Because of the high unsaturation of these polymers, the anti-oxidant, phenyl β-naphthylamine, was included in the formulations to protect the compounds from oxidation during the heating period.

With natural rubber, static heating of the masterbatch does not produce higher extension modulus in the vulcanizate and tensile strength is significantly decreased. This is the case whether the plasticizer is added before or after the heat treatment, a situation quite different from that encountered with the isoolefin-diolefin copolymer.

Heat treatment of the butadiene-styrene copolymer and channel black masterbatch leads to vulcanizates with increased moduli of extension. Higher modulus is obtained, however, when the plasticizer is present in the masterbatch than when it is not and in this respect the action is different from that of isoolefin-diolefin copolymers. Unlike natural rubber, there is no loss of tensile strength in this instance.

Although the internal viscosity changes with natural rubber and butadiene-styrene rubbery copolymers follow generally the pattern of those with isoolefin-diolefin copolymers, the magnitude of the decrease in the case where the plasticizer is added after heat treatment is much less with the former than with the latter. Taking the nonheated samples as controls, the following data are presented to illustrate this point:

|  | Isoolefin-diolefin copolymer | Natural rubber | Butadiene-styrene copolymer |
|---|---|---|---|
| Percent decrease in internal viscosity ($\eta f$) at 50° F. when— | | | |
| (a) Plasticizer is added before heat treatment | 22 | 22 | 25 |
| (b) Plasticizer is added after heat treatment | 55 | 34 | 30 |

Electrical resistivity is very greatly increased by heat treating natural rubber and butadiene-styrene copolymer masterbatches with channel black. The magnitude of the increase appears independent of the order in which plasticizer is added and this then constitutes another difference between the isoolefin-diolefin copolymers and the higher unsaturated rubbery materials.

EXAMPLE 3

*Effect of adding surface oxygen to furnace black*

Since it is well known that furnace carbon blacks have essentially unoxidized surfaces, a study was made of the effect produced on the process by the addition of oxygen to the surface of a furnace carbon black sample.

For carrying out the following experiments, an SRF (Gastex) furnace black was heat treated in the presence of an oxygen flow in an oven at a temperature of 250°–300° C. for about 65 hours. The original pH of the carbon, in a water slurry, was about 9.5. At the end of that time, the surface pH of the carbon black was about 5. The combined oxygen was determined analytically by the Unterzaucher method to be about 3.6–3.8%. A commercial grade of channel type carbon black has been shown to have about 3.17% by weight combined oxygen.

In carrying out the experiments for evaluation of the oxidized furnace black as prepared by the above described method, the oxygenated furnace black (control) mixed with copolymer under ordinary conditions is sample 10. The oxygenated furnace black was mixed with isobutylene-isoprene copolymer on a laboratory mill (setting= 0.040″) to give a masterbatch which was later subjected to heat treatment. Sample 11 contained the plasticizer during the heat treatment, while the plasticizer was added to sample 12 after the treatment. The mixing data are shown in Table III.

TABLE III

|  | Parts by weight | | |
|---|---|---|---|
| Sample No | 10 | 11 | 12 |
| Component: | | | |
| Isobutylene-isoprene copolymer (GR-I)[1] | | 100.0 | 100.0 |
| Oxidized furnace black (pH 5.0)[1] | | 50.0 | 50.0 |
| Stearic acid[1] | | 0.5 | 0.5 |
| Forum 40 (plasticizers)[1] | | 10.0 | |
| Isobutylene-isoprene copolymer | 100.0 | | |
| Oxidized furnace black (pH 5.0) | 50.0 | | |
| Stearic acid | 0.5 | | |
| Forum 40 (plasticizer oil) | 10.0 | | 10.0 |
| Zinc oxide | 5.0 | 5.0 | 5.0 |
| Sulfur | 2.0 | 2.0 | 2.0 |
| Tetramethylthiuram disulfide | 1.0 | 1.0 | 1.0 |
| 2,2′-benzothiazyl disulfide | 1.0 | 1.0 | 1.0 |

[1] Masterbatches for heat treatment—Masterbatches heated 1 hour at 320° F. in open steam and then milled 5 minutes under standard conditions (80°–90° F. initial roll temperature, 0.040–0.045″ roll clearance). Four such cycles were used.

Vulcanization of the samples was conducted at 307° F. for 45 minutes. The resulting data on stress-strain properties of the three cured samples are shown in Table IV.

TABLE IV

| Sample No | 10 | 11 | 12 |
|---|---|---|---|
| Modulus at— | | | |
| 100%, lbs./in.[2] | 150 | 150 | 155 |
| 200%, lbs./in.[2] | 320 | 410 | 475 |
| 300%, lbs./in.[2] | 540 | 865 | 1,110 |
| 400%, lbs./in.[2] | 795 | 1,330 | 1,700 |
| 500%, lbs./in.[2] | 1,150 | 1,725 |  |
| 600%, lbs./in.[2] | 1,675 |  |  |
| Tensile strength, lbs./in.[2] | 2,115 | 2,100 | 2,145 |
| Percent elongation | 680 | 600 | 500 |
| Viscosity, $\eta f \times 10^{-6}$, poises×C.P.S., 50° C | 1.11 | 0.83 | 0.71 |

These results clearly show that the regular SRF carbon black either in the untreated control mixture (Sample No. 10) or in the heat treated and milled mixture which contained plasticizer during heating and milling (sample No. 11) has a lower level of ultimate tensile strength and, particularly, extension modules.

It is to be further observed that, when oxygen is present on the surface of a furnace carbon black, and plasticizer is added after the treatment (sample No. 12), the viscosity is much reduced. Thus, the surface oxidation and subsequent heating and milling of these compositions prior to the addition of plasticizer materials, also yields very resilient compounds.

EXAMPLE 4

*Effect of other materials present during heat treatment on plasticizer addition*

In order to show the effect of other materials in heat treatment, a series of experiments was carried out in which a non-oxygenated SRF was mixed with isobutylene-isoprene copolymer and heat treated in the presence of a small amount of elemental sulfur. The mixing data are shown in Table V below:

TABLE V

| Component: | Parts by weight |
|---|---|
| Isobutylene-isoprene copolymer [1] | 100.0 |
| Furnace carbon black (Gastex-SRF) [1] | 50.0 |
| Sulfur [1] | 0.2 |
| Stearic acid [1] | 0.5 |
| Plasticizer | As indicated |
| Zinc oxide [2] | 10.0 |
| Sulfur [2] | 2.0 |
| Tetramethylthiuram disulfide [2] | 1.0 |
| 2,2′-benzothiazyl disulfide [2] | 1.0 |

[1] Masterbatches for heat treatment.
[2] Vulcanizing agents added after heat treatment.

The plasticizer used was Forum 40 which is an acid treated paraffinic distillate.

The data obtained from studies on these samples are shown in Table VI.

In the A series, the plasticizer was present during heat treatment. In the B series, the plasticizer was added after heat treatment. C is the control.

The masterbatch was heated 1 hour at 320° F. in open steam and milled for 5 minutes (standard 2 roll 6″ x 12″ mill, 80–90° F. initial roll temperature, 0.040–0.045″ clearance). Four such heat milling cycles were employed for the samples.

TABLE VI

|  | A Plasticizer present during heat treatment | | | | B Plasticizer added after heat treatment | | | C Control |
| --- | --- | --- | --- | --- | --- | --- | --- | --- |
| Sample No. | 7 | 8 | 9 | 10 | 11 | 12 | 13 | 14 |
| Plasticizer/100 parts of polymer | 0 | 5 | 10 | 15 | 5 | 10 | 15 | 0 |
| Modulus at— | | | | | | | | |
| 100%, lbs./in.$^2$ | 235 | 215 | 180 | 150 | 220 | 175 | 175 | 300 |
| 200%, lbs./in.$^2$ | 690 | 635 | 540 | 430 | 670 | 520 | 515 | 690 |
| 300%, lbs./in.$^2$ | 1,325 | 1,100 | 975 | 810 | 1,165 | 1,000 | 950 | 1,135 |
| 400%, lbs./in.$^2$ | 1,890 | 1,500 | 1,325 | 1,145 | 1,580 | 1,400 | 1,320 | 1,500 |
| 500%, lbs./in.$^2$ |  | 1,985 | 1,725 | 1,500 | 2,025 | 1,840 | 1,720 |  |
| 600%, lbs./in.$^2$ |  |  |  | 1,960 |  |  |  |  |
| Tensile strength, lbs./in.$^2$ | 2,100 | 2,180 | 1,985 | 2,100 | 2,175 | 2,070 | 1,900 | 1,640 |
| Percent elongation | 455 | 525 | 555 | 625 | 540 | 555 | 550 | 445 |
| Tear strength, lbs./in.$^2$ | 145 | 150 | 155 | 170 | 170 | 165 | 160 | 135 |
| Viscosity, $\eta f \times 10^{-6}$, poises $\times$ C.P.S.* | 1.20 | 0.91 | 0.90 | 0.64 | 0.95 | 0.80 | 0.62 | 1.77 |
| Modulus, $K \times 10^{-7}$ dynes/cm.$^2$ * | 6.41 | 5.44 | 4.82 | 4.42 | 5.26 | 4.72 | 4.44 | 7.58 |
| Frequency, f, C.P.S.* | 4.36 | 4.16 | 4.03 | 3.88 | 4.08 | 4.01 | 3.91 | 4.48 |
| OVEN AGED—7 DAYS AT 100° C. | | | | | | | | |
| Modulus at— | | | | | | | | |
| 100%, lbs./in.$^2$ | 210 | 240 | 200 | 180 | 250 | 215 | 200 | 330 |
| 200%, lbs./in.$^2$ | 690 | 690 | 600 | 505 | 730 | 630 | 600 | 780 |
| 300%, lbs./in.$^2$ | 1,225 | 1,150 | 1,040 | 900 | 1,215 | 1,090 | 1,040 | 1,235 |
| 400%, lbs./in.$^2$ | 1,750 | 1,530 | 1,385 | 1,235 | 1,600 | 1,475 | 1,380 | 1,600 |
| 500%, lbs./in.$^2$ |  |  |  | 1,600 |  |  |  |  |
| Tensile strength, lbs./in.$^2$ | 1,860 | 1,750 | 1,690 | 1,685 | 1,740 | 1,720 | 1,720 | 1,650 |
| Percent elongation | 430 | 470 | 490 | 525 | 450 | 475 | 490 | 415 |
| Percent tensile retention | 88.5 | 80.3 | 85.1 | 80.2 | 80.0 | 83.1 | 90.5 | 100 |
| Percent elongation retention | 94.5 | 89.5 | 88.2 | 84.0 | 83.3 | 85.6 | 89.1 | 93.3 |
| Percent change in modulus at 300% | −7.6 | +4.5 | +6.6 | +11 | +4.3 | +9.0 | +9.4 | +8.8 |
| Tear strength | 150 | 130 | 135 | 120 | 110 | 135 | 140 | 160 |

* Free vibration method with Yerzley oscillograph; work at 50° C.

These data show that the carbon black used must have oxygen present on its surface, or stated another way, the carbon black must have an oxidized surface. The presence of other promoter type materials such as sulfur does not give the improved results obtained by the novel process, since substantially no differences in properties are shown regardless of when the plasticizer is added.

Likewise, tests carried out on copolymer mixtures containing thermal black (P-33) with sulfur present during the heat treatment show that substantially no improved effect is obtained.

EXAMPLE 5

*Effect of other materials present during heat treatment on plasticizer addition*

A further example was carried out to test the effect of addition of other materials. Auxiliary chemicals including p-dinitroso benzene (Polyac) were studied. The mixing data are shown in Table VII below.

TABLE VII

| Component: | Parts by weight |
| --- | --- |
| Isobutylene-isoprene copolymer [1] | 100.0 |
| Furnace carbon black (Gastex–SRF) [1] | 50.0 |
| p-Dinitrosobenzene (Polyac) [1] | 0.5 |
| Stearic acid [1] | 0.5 |
| Plasticizer | As indicated |
| Zinc oxide [2] | 5.0 |
| Sulfur [2] | 2.0 |
| Tetramethylthiuram disulfide [2] | 1.25 |

[1] Masterbatches for heat treatment.
[2] Vulcanizing agents added after heat treatment.

The plasticizer used was Forum 40, a hydrocarbon oil. In Series A, the plasticizer was added before the heat treatment. In Series B, the plasticizer was added after the heat treatment. The heat treatment was carried out substantially the same as in Example 4.

The data obtained from this series of experiments is shown in Table VIII below.

TABLE VIII

|  | A Plasticizer added before heat treatment | | | | B Plasticizer added after heat treatment | | |
| --- | --- | --- | --- | --- | --- | --- | --- |
| Sample No. | 15 | 16 | 17 | 18 | 19 | 20 | 21 |
| Plasticizer/100 parts of polymer | 0 | 5 | 10 | 15 | 5 | 10 | 15 |
| Modulus at— | | | | | | | |
| 100%, lbs./in.$^2$ | 235 | 190 | 170 | 150 | 190 | 150 | 150 |
| 200%, lbs./in.$^2$ | 760 | 600 | 535 | 450 | 570 | 450 | 420 |
| 300%, lbs./in.$^2$ | 1,370 | 1,125 | 1,025 | 885 | 1,075 | 900 | 835 |
| 400%, lbs./in.$^2$ | 1,875 | 1,565 | 1,425 | 1,280 | 1,535 | 1,320 | 1,220 |
| 500%, lbs./in.$^2$ |  | 1,950 | 1,875 | 1,620 | 1,950 | 1,720 | 1,565 |
| 600%, lbs./in.$^2$ |  |  |  | 1,975 |  |  |  |
| Tensile strength, lbs./in.$^2$ | 2,145 | 2,090 | 2,075 | 2,065 | 2,180 | 2,000 | 1,950 |
| Percent elongation | 480 | 545 | 575 | 620 | 555 | 575 | 595 |

These data also show the lack of effect given by such compounds as p-dinitrosobenzene when used in the process with carbon black having no oxygen surface. There are substantially no differences in product properties regardless of when the plasticizer is added.

EXAMPLE 6

Dioctyl sebacate was incorporated in oxygenated SRF black compounds as well as in the control carbon compounds. To the series of mixtures sufficient dioctyl sebacate was added to obtain 25 parts of plasticizer on 100 parts of butyl polymer. The effect upon tension properties after a 40′ cure at 320° F. is shown in Table IX.

TABLE IX.—EFFECT OF 25 PARTS OF DIOCTYL SEBACATE IN OXYGENATED SRF BLACK COMPOUNDS

[Cure 40' at 320° F.]

| Sample | 100% E | 200% E | 300% E | Tensile | Elong. |
|---|---|---|---|---|---|
| Req. SRF Black, control mix | 130 | 300 | 465 | 1,450 | 670 |
| Req. SRF Black, heat treated and remilled | 120 | 270 | 460 | 1,425 | 620 |
| Oxidized SRF Black, control mix | 80 | 190 | 350 | 1,880 | 750 |
| Oxidized SRF Black, heat treated and remilled | 85 | 250 | 560 | 1,780 | 650 |

The plasticized compounds display the same relative physical properties at a lower level. Oxygenated carbons still yield the highest tensile and exhibit a marked responsiveness to heat treatment of rubber-pigment masterbatches. The modulus characteristics of the oxygenated SRF carbon in the control mix are lower than the untreated pigment compounds, but thermal treatment and remilling imparts the characteristically high stress at elongation in excess of 200%. In other words the benefits of a heat treated-oxygenated carbon compound persist in the presence of plasticizers.

The advantages of this invention will be apparent to those skilled in the art. Means are provided for getting flexible, supple, resilient butyl vulcanizate with full reinforcement carbons.

It is to be understood that this invention is not limited to the specific examples which have been offered merely as illustrations and that modifications may be made without departing from the spirit of the invention.

What is claimed is:

1. A process which comprises in combination mixing carbon black having an oxygen-containing surface and a pH of less than 7, with a rubbery copolymer of an isomonoolefin having from 4 to 8 carbon atoms and from 0.5 to 15% of a conjugated diolefin having from 4 to 14 carbon atoms, said copolymer having an iodine number of from 0.5–50 (Wijs), and subjecting said mixture in the absence of vulcanizing agents to an elevated temperature of about 250°–450° F., inversely for an extended period of time of about ten minutes to seven hours, sufficient to produce heat-interaction between the copolymer and oxy-carbon black, and thereafter adding thereto a dialkyl sebacate plasticizer utilized in an amount of 2–50 wt. percent based on the copolymer, whereby both the stress properties and the elastic properties of the copolymer are improved.

2. The process of claim 1 in which the carbon black is utilized in an amount of from about 20 to 200 parts by weight based on 100 parts of the copolymer.

3. The process of claim 2 in which the isoolefin is isobutylene and the conjugated diolefin is isoprene.

4. The process of claim 3 in which the plasticizer is dioctyl sebacate.

5. A process which comprises in combination mixing from about 20 to 200 parts by weight of carbon black having an oxygen-containing surface and a pH of less than 7 with 100 parts by weight of a rubbery copolymer of isobutylene and from 0.5 to 15% of isoprene said copolymer having an iodine number of from 0.5 to 50 (Wijs) and subjecting said mixture in the absence of vulcanizing agents to an elevated temperature of about 250° to 450° F. inversely for an extended period of time from about 10 minutes to 7 hours sufficient to produce heat interaction between the copolymer and oxy carbon black, and thereafter adding from 5 to 25 wt. percent based on the polymer of dioctyl sebacate.

References Cited by the Examiner

UNITED STATES PATENTS

| 2,349,412 | 5/44 | Douglas | 260—31.8 |
| 2,498,453 | 2/50 | Schaerer | 260—31.8 |
| 2,561,239 | 7/51 | Smith | 260—31.8 |
| 2,852,486 | 9/58 | Gessler | 260—33.6 |
| 2,996,472 | 8/61 | Gessler et al. | 260—33.6 |

ALEXANDER H. BRODMERKEL, *Primary Examiner.*

DANIEL ARNOLD, *Examiner.*